United States Patent
Bucklew et al.

(10) Patent No.: US 11,558,123 B2
(45) Date of Patent: Jan. 17, 2023

(54) QUANTUM COMMUNICATIONS SYSTEM HAVING STABILIZED QUANTUM COMMUNICATIONS CHANNEL AND ASSOCIATED METHODS

(71) Applicant: EAGLE TECHNOLOGY, LLC, Melbourne, FL (US)

(72) Inventors: Victor G. Bucklew, Richmond, VA (US); Michael R. Lange, Melbourne, FL (US); James A. Nagel, Fort Wayne, IN (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 66 days.

(21) Appl. No.: 17/179,490

(22) Filed: Feb. 19, 2021

(65) Prior Publication Data

US 2022/0271847 A1     Aug. 25, 2022

(51) Int. Cl.
| | | |
|---|---|---|
| H04B 10/00 | (2013.01) |
| H04B 10/70 | (2013.01) |
| H04B 10/508 | (2013.01) |
| H04B 10/61 | (2013.01) |
| H04J 14/00 | (2006.01) |

(52) U.S. Cl.
CPC ........... *H04B 10/70* (2013.01); *H04B 10/508* (2013.01); *H04B 10/614* (2013.01)

(58) Field of Classification Search
CPC .............................. H04B 10/70; H04L 9/0852
See application file for complete search history.

(56) References Cited

U.S. PATENT DOCUMENTS

| | | |
|---|---|---|
| 7,174,105 B2 | 2/2007 | Shahar et al. |
| 7,738,165 B2 | 6/2010 | Ahn et al. |
| 7,831,049 B1 | 11/2010 | Kanter |
| 9,306,739 B1 | 4/2016 | Troupe |
| 9,621,263 B2 | 4/2017 | Wei et al. |
| 9,634,770 B2 | 4/2017 | Dynes et al. |
| 10,109,976 B2 | 10/2018 | Wise et al. |
| 10,313,113 B2 | 6/2019 | Frohlich et al. |
| 11,050,559 B2 | 6/2021 | Bucklew et al. |
| 11,082,216 B2 | 8/2021 | Bucklew et al. |
| 2003/0002674 A1 | 1/2003 | Nambu et al. |

(Continued)

FOREIGN PATENT DOCUMENTS

| | | |
|---|---|---|
| CN | 109217938 | 4/2020 |
| EP | 1935119 | 11/2011 |

(Continued)

OTHER PUBLICATIONS

Bucklew et al., U.S. Appl. No. 16/658,398, filed Oct. 21, 2019.

(Continued)

*Primary Examiner* — Daniel G Dobson
(74) *Attorney, Agent, or Firm* — Allen, Dyer, Doppelt + Gilchrist, P.A.

(57) ABSTRACT

A quantum communications system may include transmitter node, a receiver node, and a quantum communications channel coupling the transmitter node and receiver node. The transmitter node may be configured to co-propagate a first pulse for a quantum state and a second pulse to stabilize the quantum state through the quantum communications channel.

31 Claims, 7 Drawing Sheets

(56) References Cited

U.S. PATENT DOCUMENTS

| | | | | |
|---|---|---|---|---|
| 2005/0281561 | A1* | 12/2005 | Tomaru | H04B 10/70 398/161 |
| 2007/0064945 | A1 | 3/2007 | Tuan et al. | |
| 2008/0101612 | A1 | 5/2008 | Imai et al. | |
| 2010/0310259 | A1* | 12/2010 | Meyers | H04B 10/11 398/130 |
| 2012/0177201 | A1 | 7/2012 | Ayling et al. | |
| 2013/0016835 | A1 | 1/2013 | Zbinden et al. | |
| 2016/0233964 | A1 | 8/2016 | Frohlich et al. | |
| 2016/0234017 | A1 | 8/2016 | Englund et al. | |
| 2016/0234018 | A1 | 8/2016 | Frohlich et al. | |
| 2017/0019252 | A1 | 1/2017 | Bitauld et al. | |
| 2018/0191496 | A1 | 7/2018 | Duplinskiy et al. | |
| 2018/0198608 | A1* | 7/2018 | Nordholt | H04B 10/85 |
| 2018/0343116 | A1 | 11/2018 | Nordholt et al. | |
| 2019/0323892 | A1 | 10/2019 | Ye et al. | |
| 2020/0153619 | A1 | 5/2020 | Ribordy | |
| 2020/0183250 | A1 | 6/2020 | Hall et al. | |
| 2020/0266977 | A1 | 8/2020 | Nordholt et al. | |
| 2020/0274701 | A1 | 8/2020 | Tuan et al. | |
| 2021/0099236 | A1 | 4/2021 | Bucklew et al. | |

FOREIGN PATENT DOCUMENTS

| | | |
|---|---|---|
| EP | 3185463 | 6/2017 |
| JP | 6276241 | 8/2016 |
| WO | 2012044149 | 4/2012 |
| WO | 2012074369 | 6/2012 |

OTHER PUBLICATIONS

Bucklew et al., U.S. Appl. No. 16/583,346, filed Sep. 26, 2019.
Bucklew et al., U.S. Appl. No. 16/668,002, filed Oct. 30, 2019.
Bucklew et al., U.S. Appl. No. 16/668,025, filed Oct. 30, 2019.
Bucklew et al., U.S. Appl. No. 16/687,767, filed Nov. 19, 2019.

Kenneth Steiglitz, "Soliton-Guided Quantum Information Processing," In: Adamatzky A. (eds) Advances in Unconventional Computing. Emergence, Complexity and Computation, vol. 23, pp. 297-307, Springer, Cham. https://doi.org/10.1007/978-3-319-33921-4_13, Jan. 2017, 14 pages.

Barros et al.: "Free-Space Entangled Quantum Carpets," Arxiv.Org. Cornell University Library, 201 Olin Library Cornell University, Ithaca, NY, 14853, DOI: 10.1103/Physreva.95.042311, Feb. 23, 2017, pp. 1-10.

"Quantum Key Distribution; Components and Internal Interfaces," ETSI Draft, QKD05_11_Components_Interfaces, European Telecommunications Standards Institute (ETSI), 650, Route Des Lucioles, F-06921 Sophia-Antipolis, France, Oct. 14, 2009, pp. 1-24.

Farias et al.: "Quantum Information Processing by Weaving Quantum Talbot Carpets," Arxiv.Org. Cornell University Library, 201 Olin Library Cornell University, Ithaca, NY, 14853, DOI: 10.1103/Physreva.91.062328, Dec. 8, 2014, pp. 1-11.

Donohue et al., "Coherent ultrafast measurement of time-bin encoded photons", Physical Review Letters, PRL 111, 153602, Oct. 2013, pp. 153602-1-153602-5.

Lavoie et al., "Spectral compression of single photons", Institute for Quantum Computing and Department of Physics & Astronomy, Aug. 2013, pp. 1-12.

Nunn et al., "Large-alphabet time-frequency entangled quantum key distribution by means of time-to-frequency conversion", Optics Express, vol. 21, No. 13, Jun. 2013, pp. 15959-15973.

Matsuda, "Deterministic reshaping of single-photon spectra using cross-phase modulation", Quantum Optics Matsuda Sci. Adv, Mar. 2016, pp. 1-8.

Subramaniam, "Co-propagation of pulses with steepening and phase modulation effects", Elsevier Science Optics Communications, vol. 85, No. 4, Nov. 1990, pp. 306-310.

Zhang et al., "Induced focusing of optical wave from cross-phase modulation in nonlinear metamaterials", IEEE Journal of Quantum Electronics, vol. 50, No. 10, Oct. 2014, pp. 823-830.

* cited by examiner

| PROBABILITY OF DETECTING Ψ IN INITIAL TIME BIN | STATE-OF-ART | QUANTUM COMMUNICATIONS SYSTEM |
|---|---|---|
| | 31% | 93% |

QUANTUM COMMUNICATIONS SYSTEM HAVING STABILIZED QUANTUM COMMUNICATIONS CHANNEL AND ASSOCIATED METHODS

FIELD OF THE INVENTION

The present invention relates to communications systems, and, more particularly, to quantum communications systems and related methods.

BACKGROUND OF THE INVENTION

In a quantum communications system, sometimes referred to as a quantum information system, information is exchanged between a transmitter node and a receiver node using encoded single photons. Each photon carries information that is encoded on a property of the photons, such as its polarization, phase, or energy in time. These quantum communications systems generally require sending information from one node to another node, such as a transmitter node, usually referred to as "Alice," and a receiver node, usually referred to as "Bob." The term quantum communications system encompasses multiple applications. For example a quantum key distribution (QKD) system allows the sharing of cryptographic keys between the transmitter node and receiver node, thus allowing secure communications between the two parties. A QKD system provides a way to share unconditionally secure keys between Alice and Bob based on principles of physics, rather than on the challenge of performing computationally intensive calculations. A QKD system provides a way to test, on average, whether the key would be known to an unauthorized third party eavesdropper, usually referred to as "Eve."

Individual bits of the bit stream are transmitted using single photons. Information may be encoded onto a photon in such a way to reveal whether an unauthorized third party, e.g., "Eve," is monitoring the photon, since any monitoring would disturb its state. When a secret key is established between the two parties by this QKD system, the two parties may then encrypt data transmitted over any conventional communications channel.

In the QKD system, the two parties as Alice and Bob at the respective transmitter node and receiver node may use two or more non-orthogonal bases to encode bit values. The laws of quantum mechanics apply to the photons and any measurement of the photons by an eavesdropper, e.g., Eve, without prior knowledge of the encoding basis of each photon, causes an unavoidable change to the state of some of the photons. These changes to the states of the photons may cause errors in the bit values sent between the transmitter node and receiver node, and by comparing a part of the common bit steam, the two parties may determine if the eavesdropper, e.g., Eve, has gained information. Photon polarization is often used to provide the complementary properties for encoding, and is used in the common QKD protocol, BB84, and may be applied to conjugate states, such as phase encoding. Other QKD protocols, such as E91, may be based on entanglement of photon pairs and used in a QKD system.

Other applications of a quantum communications system include quantum random number generator (QRNG) systems that use the inherent indeterminacy of quantum entangled photons to produce random binary digits, and quantum secure direct communication (QSDC) systems that transfer direct information between Alice and Bob without a distribution key. In QSDC systems, the transmitter node at Alice generates quantum photons that carry secure quantum information representative of the data to be communicated. The quantum photons carrying the data are decoded upon receipt at the receiver node as Bob.

QSDC systems are based on quantum mechanics for direct transmission of information without employing a distributed cryptographic key to encrypt the data. QSDC systems may be more efficient than some keyed communication systems because the cryptographic key development and key storage requirements are eliminated. Transmitted photons carrying data within the QSDC system may be more readily maintained in confidence without being erased, manipulated or monitored by unintended third parties, such as Eve. These QSDC systems may provide tamper evident communication links that are compatible with the direct transmission of data at the single photon level. As a result, QSDC systems may become more important as quantum computers increase in sophistication and allow conventional cryptographic keys to be more easily broken, while quantum interconnects are developed that network computers together. Improvements in QSDC systems may also provide quantum signatures and improve the efficiency and impart greater security in a quantum communications channel. Further applications involve the bussing of quantum information, encoded onto single photons, from one node of a quantum computer to another, in distributed quantum computing or sensing networks.

The quantum communication channels connecting the transmitter node and receiver node may be the more vulnerable part of a quantum information system and may operate as a performance bottleneck. Quantum resources may be inherently fragile and dissipative, or degraded quantum communication channels may create communications issues because of the diffraction, dispersion, and turbulence within the channel. Dissipative examples include the dispersion caused by quantum resources that spread in time. Diffraction, on the other hand, causes the quantum resources to spread in space. Degraded examples include those situations when turbulence causes the state of the quantum resource to break-up.

Some current techniques have been developed to address these limitations by increasing the brightness of quantum sources to allow more photons to reach the receiver node. Increasing the brightness of sources at the transmitter node, means more quantum resources are created in a given moment of time. As a result, there is a greater probability that a single photon will reach the end of a communications link in a given period of time. There is also a limit in how much the photon brightness can be increased. Some quantum communication systems may not be able to successfully operate by simply increasing the number of photon events, when each photon carries important information which needs to be preserved for later computations. An adaptive wave front control mechanism may mitigate the impact of wave front distortions on individual photons. Techniques of adaptive optics apply equal and opposite phase to a proton to increase the probability that a photon state will be effectively received. However, this process can create loss, does not necessarily preserve the original state of the photon, and introduces additional latencies into a quantum communications system.

SUMMARY OF THE INVENTION

In general, a quantum communications system may include a transmitter node, a receiver node, and a quantum communications channel coupling the transmitter node and receiver node. The transmitter node may be configured to co-propagate a first pulse for a quantum state and a second pulse to stabilize the quantum state through the quantum communications channel.

The first and second pulses have different energies. The first and second pulses may also have different frequencies. The first and second pulses may have different polarizations.

The quantum communications channel may comprise an optical fiber, or bulk medium. In another example, the quantum communications channel may comprise a liquid. The transmitter node may be configured to send information via the second pulse. The receiver node may comprise at least one single photon detector. The first pulse may comprise a modulated photon. The transmitter node may be configured to transmit a stream of the first pulses in a quantum key distribution (QKD) protocol.

A method aspect is for operating a quantum communications system using a transmitter node, a receiver node, and a quantum communications channel coupling the transmitter node and receiver node. The method may include operating the transmitter node to co-propagate a first pulse for a quantum state and a second pulse to stabilize the quantum state through the quantum communications channel. The method may also include operating the receiver node to receive the first pulse.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete.

Figure 1:
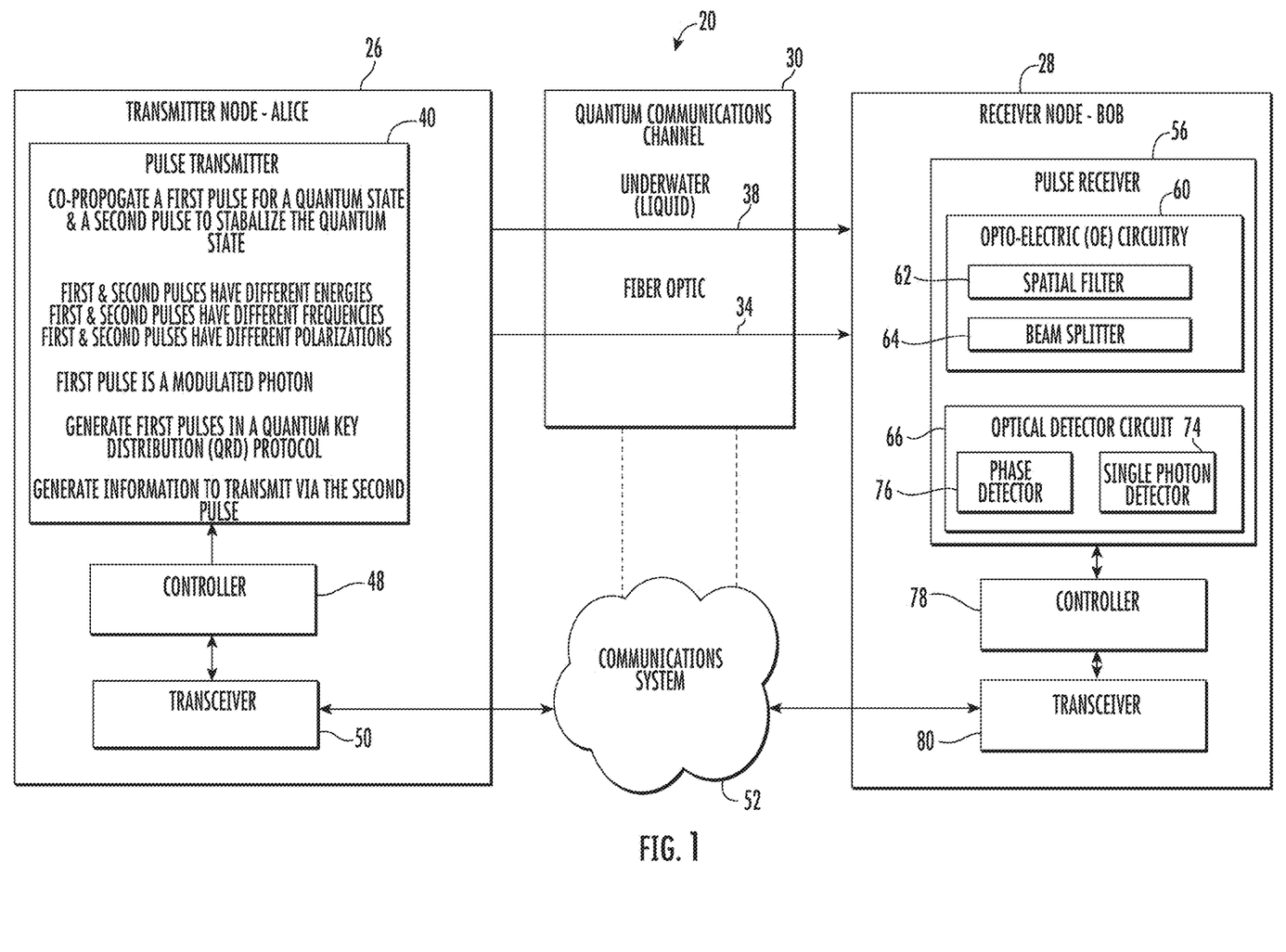
FIG. 1 is a block diagram of the quantum communications system with the stabilized quantum state in accordance with a non-limiting example.

Referring initially to FIG. 1, a quantum communications system is illustrated generally at 20. The quantum communications system 20 includes a transmitter node 26 referred to as Alice, a receiver node 28 referred to as Bob, and a quantum communications channel 30 coupling the transmitter node and receiver node. The quantum communications system 20 may use single photon self-interference, and use the no-cloning theorem of quantum mechanics as a physical layer of security that can be used to more securely transmit quantum data streams within the quantum communications channel 30 without the additional use of a cryptographic key in some embodiments.

The input state at the transmitter node 26 undergoes self-interference that broadly redistributes its probability distribution function and spoofs attempts to gain information about it within the public sections of the quantum communications channel 30 where an eavesdropper, referred to as Eve, would be located.

Photon self-interference in the spatial domain and use of a spatial filter in the spatial domain may reveal data tampering. Because the spatial probability distribution function cannot be perfectly categorized, cloned and reintroduced to the public section of the quantum communications channel 30, any attempt to monitor, misrepresent or omit temporal data may introduce spatial probability distribution changes that will not cleanly exit a spatial filter at the receiver node 28, thus revealing tampering by an interferer within the public link of the quantum communications channel.

In an example, the quantum communications channel 30 may include a fiber optic communications channel 34, which may be a single mode optical fiber or a multi-mode fiber. The single mode optical fiber may be used for transmitting temporally modulated photons, and the multi-mode optical fiber may be used for transmitting both temporally and spatially modulated photons. The quantum communications channel 30 may include an underwater communications channel 38 or other liquid medium for quantum communications.

As illustrated, the transmitter node 26 includes a pulse transmitter 40 as a laser pulse source. The transmitter node 26 also includes a controller 48 that operates the pulse transmitter 40 and a transceiver 50 that connects to a communication system 52 as will be explained in further detail below and which may be part of the quantum communications channel 30. The receiver node 28 includes a pulse receiver 56. The pulse receiver 56 may include opto-electric (OE) circuitry 60 having a spatial filter 62 and a beam splitter 64 that splits signals into a phase basis or time basis at an optical detector circuit 66, which includes a phase detector apparatus 76 and single photon detector 74. The receiver node 24 includes a controller 78 and transceiver 80 connected thereto. The transceiver 80 is coupled to the communications system 52.

The transmitter node 29 via its pulse transmitter 40 in this example is configured to co-propagate a first pulse for a quantum state and a second pulse to stabilize the quantum state through the quantum communications channel 30. In an example, the first and second pulses may have different energies. In another example, the first and second pulses may have different frequencies, and in yet another example, the first and second pulses may have different polarizations or any combination of energies, frequencies, and polarizations. Information may be sent via the second pulse, e.g., non-quantum communications, including timing data, position data, information about basis selection for quantum key distribution protocols, data regarding party authentication, or other information and data that is not transmitted and received via the quantum communications channel 30. The second pulse stabilizes the quantum communications channel so that pulses in their quantum states may propagate to the receiver node 28 without dissipating. In an example, the quantum pulse may be formed as a modulated photon, and the receiver node 28 may include the at least one single photon detector 74 that detects a modulated photon, e.g., contained in time bins.

The pulse transmitter 40 may be configured to generate temporally modulated photons. The pulse receiver 56 may include opto-electric (OE) circuitry 60 that detects phase bin states using the optical detector circuit 66. The pulse receiver 56 may include at least one single photon detector 74. The pulse transmitter 40 may also be configured to generate spatially modulated photons and perform optical polarization encoding. The pulse transmitter 40 may be configured to generate a stream of quantum pulses in a quantum key distribution (QKD) protocol as explained in further detail below.

In an example, the transmitter node 26 may be configured to generate temporally modulated photons that are communicated over the fiber optic communications channel 34, which may be single mode optical fiber. The transmitter node 26 may also be configured to generate spatially modulated photons that are transmitted over a multi-mode optical fiber. In both cases, the temporally or spatially modulated photons may use optical polarization encoding, and each photon may represent information through a particular basis.

The transmitter node 26 not only communicates with the receiver node 28 over the quantum communications channel 30, but also both transmitter and receiver nodes 26,28 may communicate via the communications system 52, which may include a classical communications channel and may be fiber optic, free-space, wired, or another conventional communications channel. This communications system 52 may be used if additional functions are desired, such as cryptographic key generation and quantum key distribution (QKD), or communication with networked devices using conventional transceivers. The quantum communications system 20 may use cryptographic key sifting or operate as a QSDC system. The quantum communications channel 30 may be part of the communication system 52 as indicated by the dashed lines connecting the two, indicating that both the quantum communications and non-quantum communications may be transmitted over any communications channel as part of the communications system 52.

In an example, the quantum pulse output from the pulse transmitter 40 at the transmitter node 26 may be an output bit stream of photons that are encoded bit values. The photon polarization may provide a complementary property used for encoding purposes, such as in the QKD protocol, BB84, and may be applied to conjugate states such as phasing encoding. Other protocols, such as the E91 protocol, may be used that includes the entanglement of photon pairs. Each bit of information such as a "0" or "1" may be encoded onto an individual photon by selecting from a pair of orthogonal polarization states. In the BB84 QKD protocol, two pairs of orthogonal states are used, and each pair of orthogonal states is referred to as a "basis." The basis may provide polarization state pairs in a rectilinear basis having vertical and horizontal polarization, such as 0° and 90°, and a diagonal basis having opposite diagonal direction polarization, such as 45° and 135°.

It is also possible to use a circular basis of left-handedness and right-side handedness depending on what other bases are used that are conjugate to each other. The quantum communications system 20 may use an unencrypted non-quantum communications channel, such as the communications system 52, for the key exchange or key sifting process, as key exchange is commonly called. It is possible to use a continuous-variable QKD (CV-QKD) protocol or a discrete-variable (DV-QKD) protocol. Single protons may be generated for the DV-QKD protocol, usually as optical pulses, and requires single photon detectors 74 at the receiver node 28, for example, as an array of single photon optical detectors. In contrast to the DV-QKD protocol, the CV-QKD protocol may use conjugate-continuous degrees of freedom (field quadratures) of a light pulse prepared in a Gaussian (coherent or squeezed) state to transmit signals that constitute a shared randomness. At the receiver node 28, the field quadratures of each light pulse may be measured using as an example, shot-noise limited, balanced homodyne or heterodyne detectors, such as phase detectors 76, which have an advantage of not requiring single photon detection and operating at high GHz speed detection rates. In the CV-QKD protocol, often a local oscillator (OL) signal may be generated at the transmitter node 26 and the CV-QKD protocol may involve polarization encoding and multiplexing techniques.

As noted before, the transceiver 50 at the transmitter node and the transceiver 80 at the receiver node 28 may communicate with the communications system 52, which may be a conventional or non-quantum communications system. For example, Bob as the party at the receiver node 28 may communicate with Alice as the party at the transmitter node 26 over the conventional communications system 52, and transmit data regarding the basis in which each photon was received at the receiver node 28. The transmitter node 26, e.g., Alice, may transmit data about the basis in which each photon was transmitted to the receiver node 28, e.g., Bob, using the communications system 52. Any bits having a different basis may be discarded, leaving the remaining bits as the basis for a shared cryptographic key in the key verification or key shifting phase. The subset of shared bits used by both parties, e.g., Alice and Bob as to the respective transmitter node 26 and receiver node 28, may be used to check against eavesdropping by the unauthorized party, e.g., Eve, which would have introduced errors into the communications stream of bits.

The transmitter node 26 with the pulse transmitter 40 may include other components not illustrated in detail, such as a spatial light modulator (SLM) that imposes a spatially varying modulation by modulating intensity and phase, a waveguide array and circuitry that generates phase bin states, and an attenuation filter.

As noted before, the transmitter node 26 includes the pulse transmitter 40 for generating "quantum" pulses as first pulses and second optical pulses that stabilize the quantum state. Although a pulse transmitter 40 as a laser is described, it should be understood that other sources of the pulses may be used that generate the first quantum pulses and second optical stabilizing pulses. It is possible depending on system design for one or more light emitting diodes (LED's) to be used to generate the stream of first and second quantum and optical pulses.

The pulse output from the transmitter node 26 may include an output bit stream of photons that are encoded bit values. The photons may be temporally or spatially modulated photons and have a transmitted quantum basis that includes time and phase parameters, including optical polarization encoding. The photon polarization provides the complementary property used for encoding purposes and in the quantum communications system 20 as described, pulses arranged in time bins in this example, and photon polarization may be applied to conjugate states, such as phase encoding. The quantum communications system 20 may use entanglement of photon pairs. Each bit of information such as a "0" or "1" may be encoded onto an individual photon by selecting from a pair of orthogonal polarization states. In an example, two pairs of orthogonal states may be used, and each pair of orthogonal states may be referred to as a "basis." The bases may provide polarization state pairs in a rectilinear basis having vertical and horizontal polarization, such as 0° and 90°, and a diagonal basis having opposite diagonal direction polarization, such as 45° and 135°. It is also possible to use a circular basis of left-handedness and right-handedness depending on what other bases are used that are conjugate to each other.

The transmitter node 26 includes its controller 48 operatively connected to the laser pulse transmitter 40 and other components at the transmitter node 26 for controlling their operation, such that the pulse transmitter is controlled for transmitting a photon in a polarization state defined by the bit and basis and in time bins, and record the time the photon was transmitted. This process is repeated for the string of bits as a stream of photons. The transmitter node 26 may include its transceiver 50 connected to the controller 48 and operative to communicate with conventional networked components via the communications system 52. Additional functions for Quantum Key Distribution (QKD) with the receiver node 28 may be provided via the communications system 52.

The transmitter node 26 may transmit the first quantum pulses and second stabilizing optical pulses over the quantum communications channel 30, such as the fiber optic communications channel 34 or underwater (liquid) link 38 as either separate or a part of the communications system 52, and either as temporally modulated photons or spatially modulated photons in an example. It is possible to use the same fiber optic communications channel 34 for both quantum communications and non-quantum communications.

The pulse receiver 56 may include in this example the opto-electronic (OE) circuitry 60 that receives the first quantum pulses and the second stabilizing optical pulses from the transmitter node 26 over the quantum communications channel 30. This OE circuitry 60 may include a spatial filter 62 and a beam splitter 64 for splitting the signal into an optical phase or time streams for measurement in the phase basis or time basis as explained below. The spatial filter 62 may be used to "clean up" the stream of optical pulses and produce a smooth intensity profile as a cleaner Gaussian signal that has unwanted multiple-order energy peaks removed such that the central maximum of a diffraction energy pattern will be passed through the OE circuitry 60. The spatial filter 62 may include a microscopic objective lens, a pinhole aperture and a positioning mechanism having precision X-Y movement at the center of the pinhole that operates as the focal point of the objective lens in a non-limiting example. The spatial filter 62 may also be advantageous because it operates as a filter for the spatial probability distribution function that may not be characterized, cloned and reintroduced to the public portion of the quantum communications channel 30. Thus, any spatial probability distribution disturbances that are introduced may not cleanly exit the spatial filter 62, and thus, Bob at the receiver node 28 may use this information as a metric to reveal tampering.

The optical detector circuit 66 receives the stream of optical pulses from the OE circuitry 60 and detects the optical pulses and generates signals that may be processed at the controller 78, which processes and demodulates the signals representative of the pulses depending on the communications protocol. At the receiver node 28, the optical detector circuit 66 may be formed as a single photon detector 74 for measuring photons in the time basis and in respective time bins, where the optical pulses are transmitted in respective time bins for data encoding. In an example, the optical detector circuit 66 may include an array of single photon detectors 74. The optical detector circuit 66 may also include a phase detector 76 for measuring the photons in the phase basis.

The controller 78 at the receiver node 28 may be connected to the conventional transceiver 80, also located at the receiver node 28. This transceiver 80 may communicate via the conventional or non-quantum communications system 52 with the other networked components or to the transceiver 50 located at the transmitter node 26. The transmitter node 26 may include other components not illustrated in detail, such as a spatial light modulator (SLM) that imposes a spatially varying modulation by modulating intensity and phase, a waveguide array that increases bit generation and phase bin states, and an attenuation filter. These components may be used to transmit temporally modulated photons or spatially modulated photons and perform optical polarization encoding.

As noted before, the OE circuitry 60 at the receiver node 28 may include a spatial filter 62 and a beam splitter 64 to split any incoming optical pulse streams for time processing and phase processing as explained in greater detail below. The optical detector circuit 66 may include the phase detector 76 and single photon detector 74 for phase basis and time basis measurements, respectively.

Generally, an eigenstate $|\Psi\rangle$ as a photon of a particular basis is prepared and transmitted from the transmitter node 26 as Alice over the quantum communications channel 30 to the receiver node 28 as Bob. In a conventional quantum communication system, if the eigenstate $|\Psi\rangle$ was prepared in the same photon basis that Eve or Bob as the receiver node 28 chooses to measure the quantum state in, both will measure the same state that Alice at the transmitter node 26 initially prepared. If Eve or Bob at the receiver node 28 choose a different basis than the one Alice at the receiver node 26 initially prepared the quantum state in, both would collapse the eigenstate $|\Psi\rangle$ into one of the eigenstates of the basis they were measuring in, and would have a 50% chance in a d=2 data structure, for example, corresponding to a random guess, of correctly identifying the associated bit value of the state that Alice sent.

This use of mutually unbiased bases, and the impact of preparing and measuring in inconsistent bases, is used to establish a more secure communications link between Alice as the transmitter node 26 and Bob as the receiver node 28 over the quantum communications channel 30. As Eve is forced to annihilate the state Alice 26 has prepared as a single photon in order to gain any information about it, and as Eve must randomly choose a basis to measure the state in, on average Eve will choose the wrong basis 50% of the time, both resulting in measurements which do not provide Eve information about the original state, and revealing Eve's presence to Bob as the receiver node 28 downstream through a quantum bit error rate (QBER) that is higher than a certain threshold value.

It is generally assumed that the eigenstate $|\Psi\rangle$ prepared in a particular basis, does not change as it propagates. Thus, If Eve and Bob as the receiver node 28 choose the same basis to measure the state that Alice as the transmitter node 26 initially used to prepare the state in, Eve and Bob will both measure it accurately. For a 4-state transmission, however, Eve has on average a 75% chance of correctly retrieving the bit value that Alice as the transmitter node 26 sends, as she has a 50% chance of correctly choosing the right basis and 100% accuracy of retrieving the associated bit value in the correct basis, and a 50% chance of choosing the wrong basis, and a 50% accuracy of retrieving the associated bit value when measuring in the wrong basis. The amount of error that Bob 28 can tolerate before knowing that the quantum communications channel 30 is insecure and that Eve is present, is in part dependent on this probability, which essentially reflects the amount of information that Eve has access to.

Increasing the maximum threshold of the quantum bit error rate (QBER) that Bob 28 can tolerate before concluding that the quantum communications channel 30 is insecure may increase secure link lengths, increase secure bit rates, and enable more efficient and cost effective implementations of the quantum communications system 20 in existing communication links and better enable secure communications for a QSDC system.

The quantum communications system 20 increases the maximum QBER threshold where an initial state |Ψ> evolves nonlinearly within the segment of public link of the quantum communications channel 30 that Eve has access to so that any measurements made at a location other than where Alice as the transmitting node 26 and Bob as the receiving node 28 are located will reduce the information available to Eve, even if Eve chooses to measure |Ψ> in the same basis that the state was initially prepared in. The quantum communications system 20 may reduce Eve's information about the eigenstate |Ψ> in the public segment of the quantum communications channel 30 even for measurements she conducts in the correct basis. The QBER threshold required for unconditional security may be increased even when Eve chooses the right basis. The probability that Eve will measure the state Alice at the transmitter node 26 initially sent is reduced. As a result, using the quantum communications system 20 of FIG. 1 as a QSDC system, Alice 26 and Bob 28 may tolerate higher system losses, increase communication link distances, relax optical detector requirements, and adapt the system into existing telecom networks.

Figure 2:
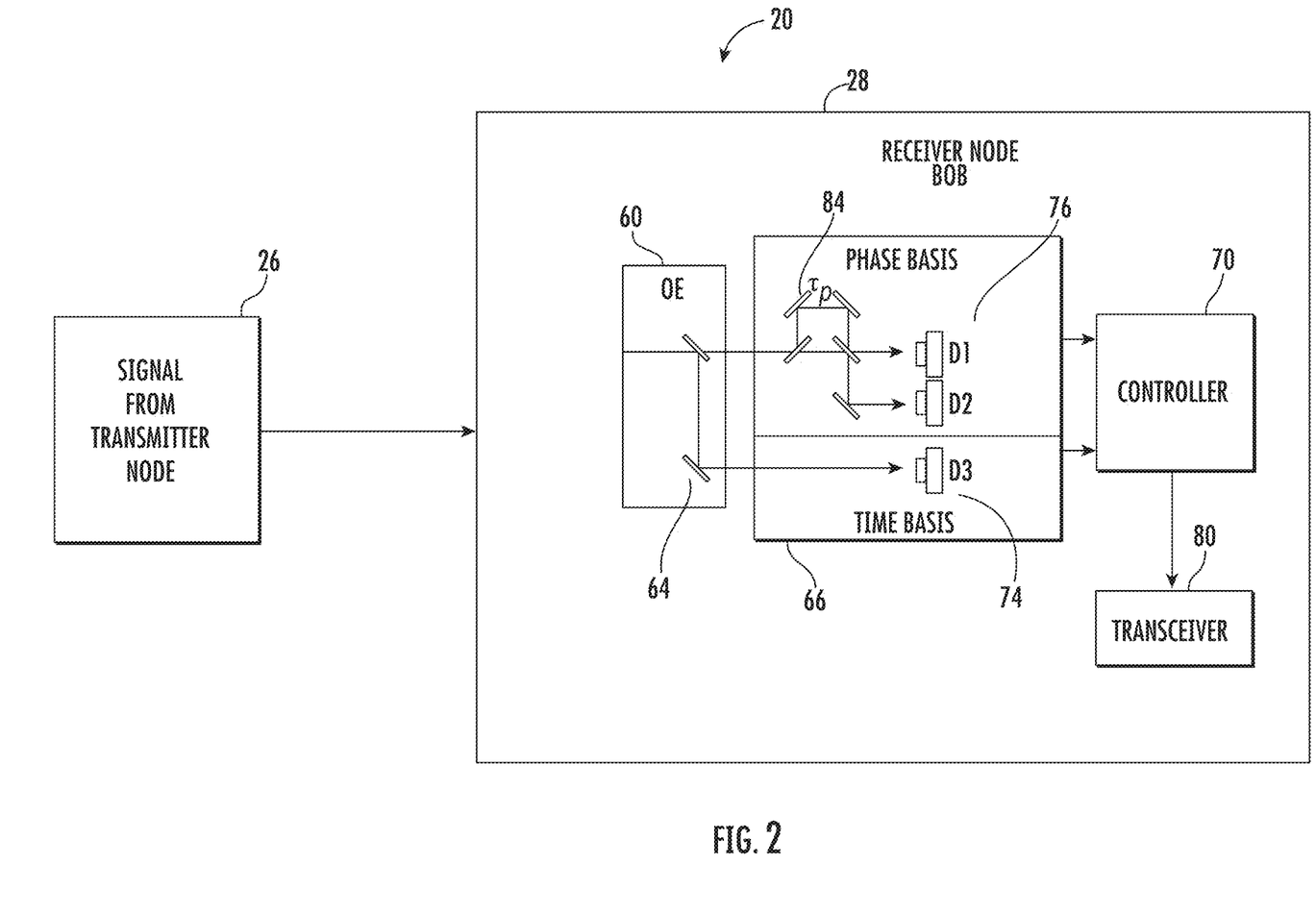
FIG. 2 is a schematic block diagram of the quantum communications system of FIG. 1 showing phase and time basis detectors at the receiver node.

Referring now to the schematic diagram of the quantum communications system 20 of FIG. 2, the receiver node 20 and its optical detector circuit 66 is shown as having a phase basis section as part of the phase detector 76, which includes detectors D1 and D2 for phase basis measurements, and in this example, a single photon detector 74 for time basis measurements and including detector D3. The quantum communications system 20 results in the correct determination of the state for the quantum basis it is intended to be measured in, and inconclusive results of the state when measured in an unintended basis. As shown in FIG. 2, the phase detector 76 includes detectors D1 and D2, and the single photon detector 74 includes detector D3 and operating to measure the time bin photons. Time basis measurements may be performed with direct detection to resolve the arrival times of pulses associated with the various bit values that Alice 26 sends. It is also possible to use the time to frequency conversion as disclosed in commonly assigned U.S. patent application Ser. No. 16/583,346 filed Sep. 26, 2019, under the title, "Quantum Communication System Having Time to Frequency Conversion and Associated Methods," the disclosure which is hereby incorporated by reference in its entirety.

An incoming photon may be randomly directed by the beam splitter 64 to either a time basis measurement at the single photon detector 74 (D3) or a phase basis measurement at the phase detector 76 (D1 and D2). For time basis measurements, detector D3 as the single photon detector 74 detects the arrival time of the photon, which correlates with a particular time bin and associated bit value.

Phase basis measurements may be performed by passing the single photon state through a Mach-Zender interferometer 84, which has a delay set by the time bin width of a protocol for the quantum communications system 20 or a half width of the waveguide for the quantum communications system. Single photon interference occurs in a central time window, which the two outputs of the Mach-Zender interferometer 84 resolve constructively or destructively depending on the eigenstate of the phase basis that was sent. For example, if phase state 1 was sent with an associated bit value 0, the phase detector 76 would yield a detection event for P1 on Detector 1, and no detection event on P1 of Detector 2. There is a non-zero probability amplitude of a detection event in the other arrival time bins (P2 and P3) for both of detectors D1 and D2 in the phase basis. However, detection events in these time bins do not help discriminate between the two states, and so they are not used to make state determinations, e.g., only the central time bins "P1" are used.

Figure 3:
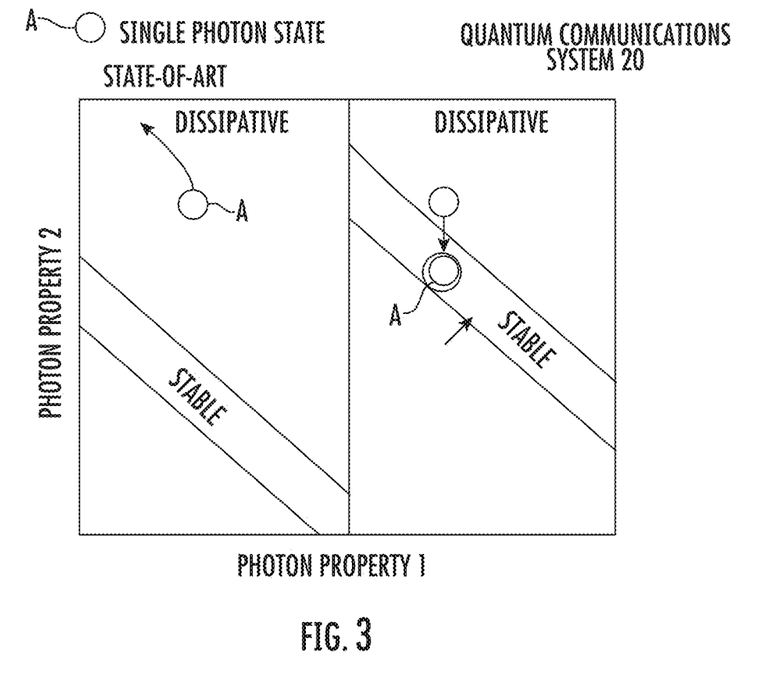
FIG. 3 is a diagram showing how a second pulse may stabilize the quantum state of a first pulse for the quantum state using the quantum communications system of FIG. 1.
Figure 4A:
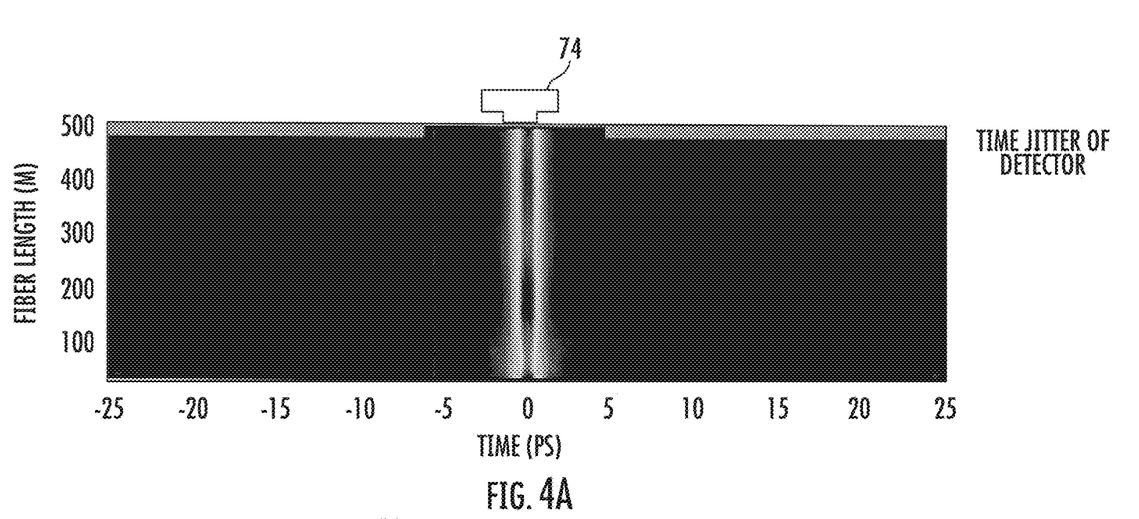
FIG. 4A is a diagram showing a first pulse for a quantum state that has been stabilized within the quantum communications channel and successfully detected.
Figure 4B:
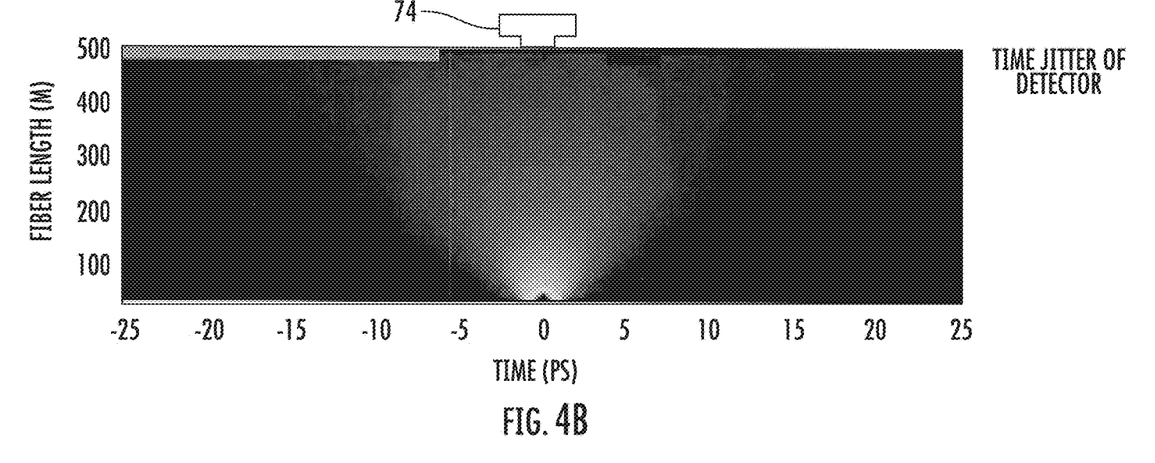
FIG. 4B is a diagram showing the dissipation of a quantum pulse when there is no stabilizing second pulse.

Referring now to FIG. 3, there is illustrated a schematic diagram illustrating at a high level how the second pulse may stabilize the quantum state of a first pulse for that quantum state using the single photon state, and comparing on the left side the state-of-art, and on the right, the quantum communications system 20 of FIG. 1 with its stable single photon state. Thus, the co-propagating first quantum pulse for a quantum state and the second stabilizing optical pulse will stabilize the quantum state through the quantum communications channel. For example, as shown in the graph of FIG. 4A, time bin quantum state photons are sent across a 500 meter optical fiber link to a detector, such as a single photon detector 74, with a 10 picosecond (PS) minimum time resolution. The quantum states maintain a well-defined and narrow temporal probability distribution function as shown by the clear communications and stabilized quantum state through the quantum communications channel in FIG. 4A. Without the second pulse to stabilize the quantum state through the quantum communications channel, there is pulse dissipation as shown in the graph of FIG. 4B.

Figure 5:
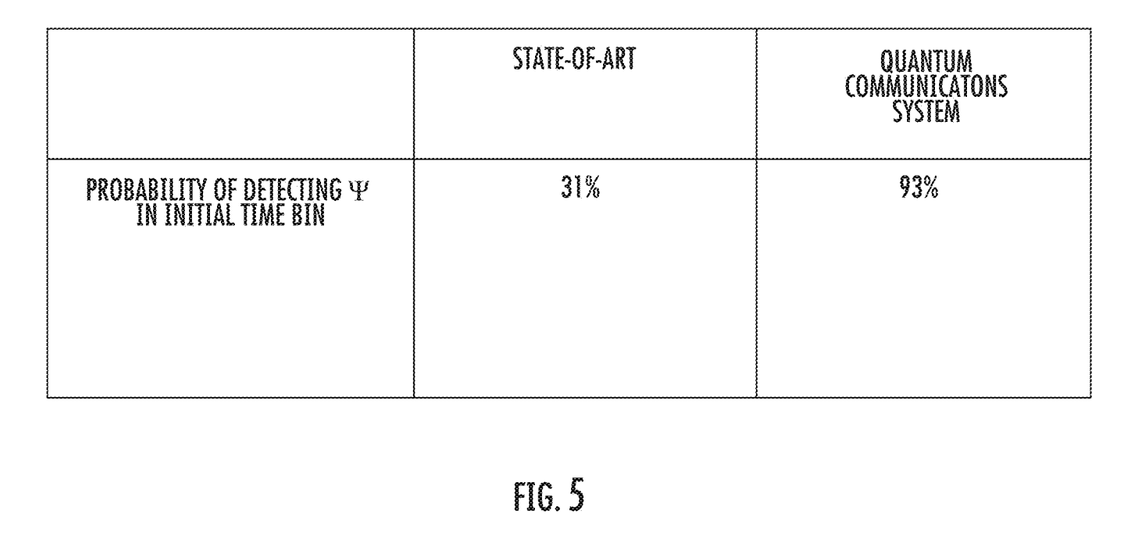
FIG. 5 is a chart showing the performance improvements when using the quantum communications system of FIG. 1.

The advantages of using the quantum communication system 20 of FIG. 1 are illustrated in the chart of FIG. 5 showing the probability of detecting an initial time bin for the state-of-art at 31%, but with the quantum communications system 20 at about 93%.

Figure 6A:
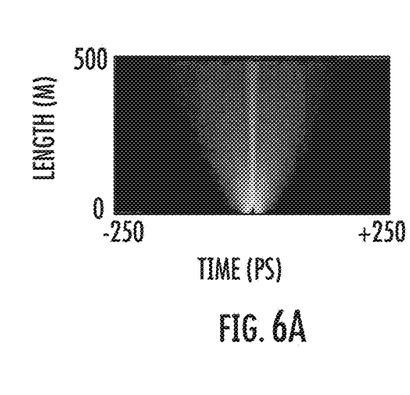
FIGS. 6A-6D are graphs showing the results of the propagation of the first pulse in the quantum state when the power of the stabilizing second pulse is varied.
Figure 6B:
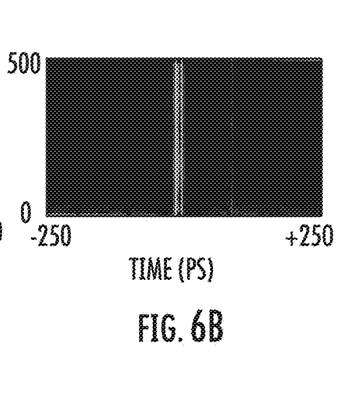
Figure 6C:
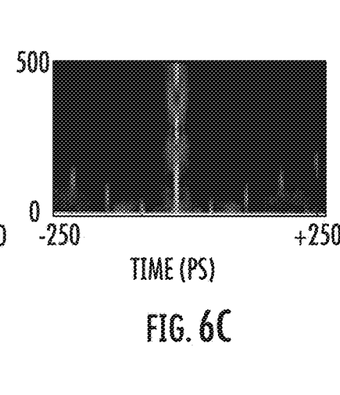
Figure 6D:
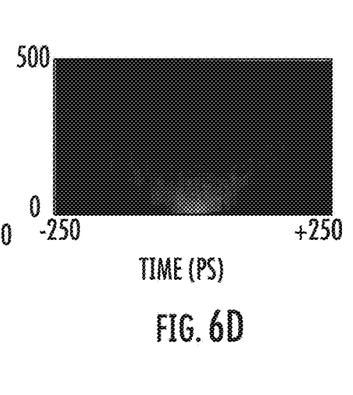
Figure 7A:
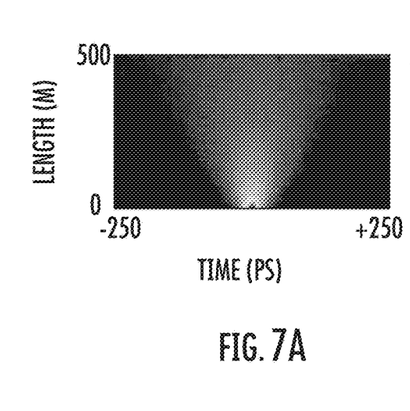
FIGS. 7A-7D are graphs showing the dissipation of the first pulse in the quantum state when there is no stabilizing second pulse.
Figure 7B:
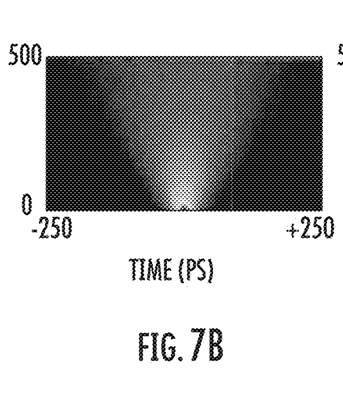
Figure 7C:
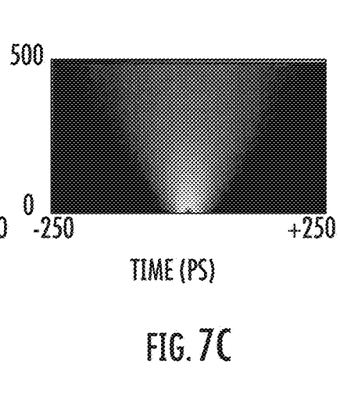
Figure 7D:
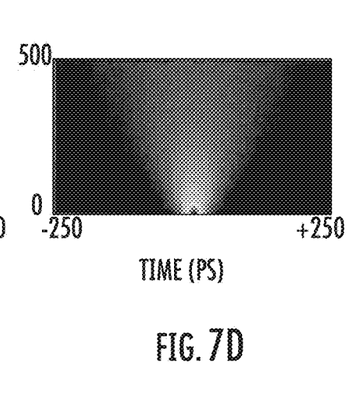

Referring now to the comparison of FIGS. 6A-6D and FIGS. 7A-7D, there are shown examples of how co-propagating a first pulse as a quantum state photon and a classical state corresponding to the second pulse used to stabilize the quantum communications channel and subsequently the quantum state propagating through it 30 so that the quantum states can propagate without dissipating. The graphs of simulations shown in FIGS. 6A-6D and 7A-7D indicate that the best transmission occurs when 90 picojoules (pJ), 500 femtosecond (fs) classical state pulse is co-propagated with the quantum pulse to create a soliton like single photon that does not change shape as it propagates (FIG. 6B). The temporal evolution of the time bin quantum state as it propagates down the channel formed by an optical fiber is shown in these figures where the graphs of FIGS. 6A-6D represent the evolution of the quantum state when co-propagating with the classical or second pulse to stabilize the quantum state. The graph in FIG. 6A shows 9 pJ of energy for the classical state, where the nonlinearity of the classical state is not enough to guide the quantum state, so the quantum state dissipates linearly due to dispersion. FIG. 6B shows 90 pJ of energy for the classical state and indicates most stable quantum communications channel, where the nonlinearity of the classical state is such that it maintains its own shape as it propagates, and also stabilizes the quantum channel through cross phase modulation, which subsequently guides and stabilizes the quantum state 30. There is dissipation of the quantum state with 900 pJ of energy in the co-propagating classical pulse shown in FIG. 6C. At 9 nJ (nanojoules), there is complete degradation of the quantum state due to the high nonlinearity of the classical state breaking the classical pulse apart, and thus destabilizing the quantum channel (FIG. 6D). The graph of FIG. 6B indicates the quantum state is pulled into the stabilizing basin of attraction caused by the co-propagating classical state. The graph in FIG. 6D shows the greatest non-linearity that dominates as the single photon state degrades. One potential way that the user can select properties of the classical pulse to effectively stabilize the quantum channel is by choosing the energy and temporal width of the classical state with the soliton energy-area theorem, based on the channel characteristics. In this example, either the fundamental or higher order solitons can be selected to stabilize the quantum channel.

The graphs of FIGS. 7A-7D show the dissipation when there is no co-propagating second pulse to stabilize the quantum state through the quantum communications channel. These different energy levels in FIGS. 7A-7D correspond to the energy levels in respective FIGS. 6A-6D.

For the underwater or other liquid communications channel 38, the energy, pulse width, frequency chirp, and wavelength of the second pulse is selected to effectively stabilize the quantum channel and guide the quantum state across it. This can be accomplished by equalizing the peak intensity of the second pulse as a classical pulse over as long of a region as possible in the presence of destabilizing channel phenomena such as index fluctuations, dispersion, diffraction, and attenuation. A realistic quantum communications channel 30 may be limited to tens of meters, where the spatial beam size may be chosen to be as small as possible to maximize the non-linearity. But for its Raleigh range, it usually will not exceed the channel length and minimize impacts of diffraction while keeping non-linearity high enough to guide the quantum length through cross-phase modulation.

It is possible to pre-chirp the classical pulse, and amplify it to a level so that its peak power is maximized, but also equalized as possible as it propagates down the quantum communications 30 channel due to dispersion and attenuation. If its peak power is equalized, the non-linear channel it creates for the quantum state is more robust, and the quantum state will be more faithfully preserved in the presence of unwanted channel index fluctuations.

Figure 8:
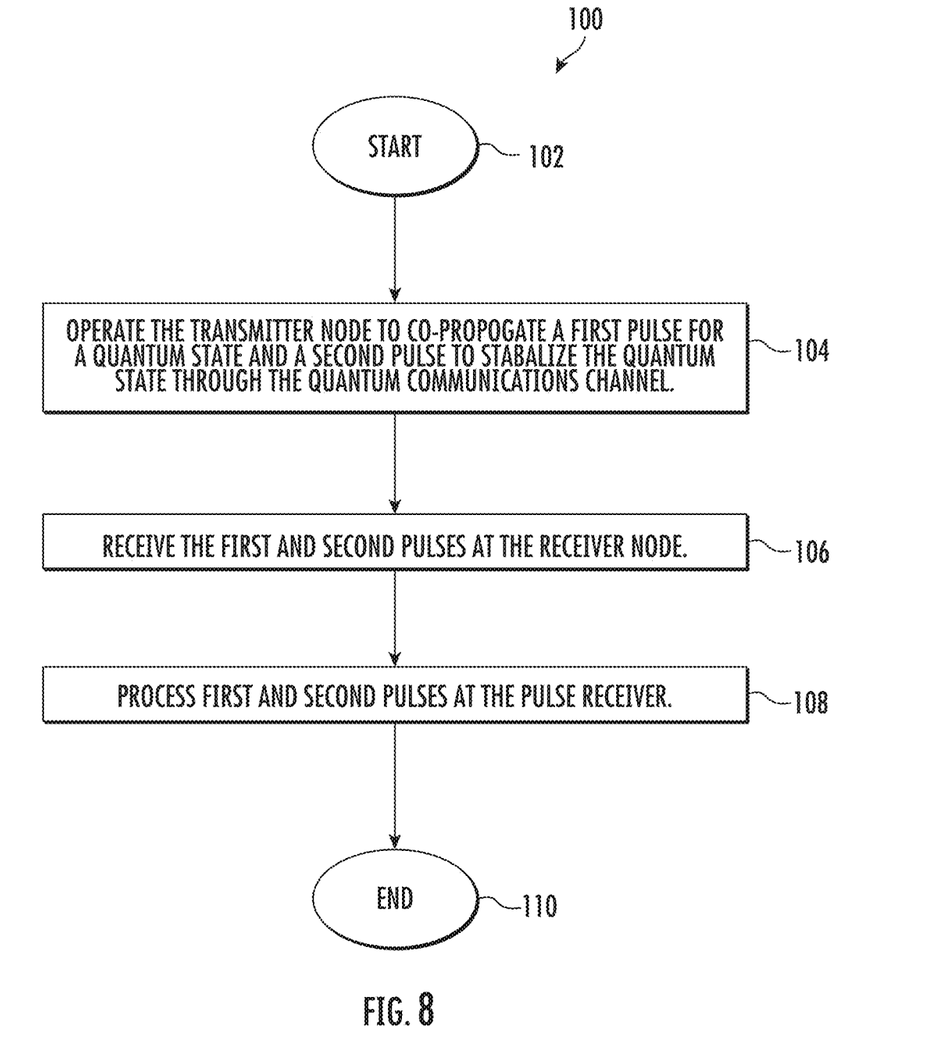
FIG. 8 is a flowchart showing an example method of operating the quantum communications system of FIG. 1.

Referring now to FIG. 8, a flowchart is illustrated generally at 100 showing a method of operating the quantum communications system of FIG. 1. The process starts (Block 102) and the transmitter node 26 is operated to co-propagate a first pulse for a quantum state and a second pulse to stabilize the quantum state through the quantum communications channel 30 (Block 104). The first and second pulses are received at a receiver node 28 (Block 106) and processed at the pulse receiver 56 (Block 108). The process ends (Block 110).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A quantum communications system comprising:
   a transmitter node, a receiver node, and a quantum communications channel coupling the transmitter node and receiver node;
   the transmitter node configured to co-propagate a first pulse for a quantum state and a second pulse to stabilize the quantum state through the quantum communications channel, the first and second pulses having different frequencies.

2. The quantum communications system of claim 1 wherein the first and second pulses have different energies.

3. The quantum communications system of claim 1 wherein the first and second pulses have different polarizations.

4. The quantum communications system of claim 1 wherein the quantum communications channel comprises an optical fiber or bulk medium.

5. The quantum communications system of claim 1 wherein the quantum communications channel comprises a liquid.

6. The quantum communications system of claim 1 wherein the transmitter node is configured to send information via the second pulse.

7. The quantum communications system of claim 1 wherein the receiver node comprises at least one single photon detector.

8. The quantum communications system of claim 1 wherein the first pulse comprises a modulated photon.

9. The quantum communications system of claim 1 wherein the transmitter node is configured to transmit a stream of the first pulses in a quantum key distribution (QKD) protocol.

10. A quantum communications system comprising:
    a communications system; and
    a quantum key distribution (QKD) system operable with the communications system and comprising
    a transmitter node, a receiver node, and a quantum communications channel coupling the transmitter node and receiver node,
    the transmitter node configured to co-propagate a first pulse for a quantum state and a second pulse to stabilize the quantum state through the quantum communications channel, the first and second pulses having different frequencies.

11. The quantum communications system of claim 10 wherein the first and second pulses have different energies.

12. The quantum communications system of claim 10 wherein the first and second pulses have different polarizations.

13. The quantum communications system of claim 10 wherein the quantum communications channel comprises an optical fiber or bulk medium.

14. The quantum communications system of claim 10 wherein the quantum communications channel comprises a liquid.

15. The quantum communications system of claim 10 wherein the transmitter node is configured to send information via the second pulse.

16. The quantum communications system of claim 10 wherein the receiver node comprises at least one single photon detector.

17. The quantum communications system of claim 10 wherein the first pulse comprises a modulated photon.

18. A method of operating a quantum communications system comprising a transmitter node, a receiver node, and a quantum communications channel coupling the transmitter node and receiver node, the method comprising:
   operating the transmitter node to co-propagate a first pulse for a quantum state and a second pulse to stabilize the quantum state through the quantum communications channel, the first and second pulses having different frequencies; and
   operating the receiver node to receive the first pulse.

19. The method of claim 18 wherein the first and second pulses have different energies.

20. The method of claim 18 wherein the first and second pulses have different polarizations.

21. The method of claim 18 wherein the quantum communications channel comprises an optical fiber or bulk medium.

22. The method of claim 18 wherein the quantum communications channel comprises a liquid.

23. The method of claim 18 wherein operating the transmitter node comprises sending information via the second pulse.

24. The method of claim 18 wherein the receiver node comprises at least one single photon detector.

25. The method of claim 18 wherein the first pulse comprises a modulated photon.

26. The method of claim 18 wherein operating the transmitter node comprises transmitting a stream of the first pulses in a quantum key distribution (QKD) protocol.

27. A quantum communications system comprising:
   a transmitter node, a receiver node, and a quantum communications channel coupling the transmitter node and receiver node;
   the transmitter node configured to
      co-propagate a first pulse for a quantum state and a second pulse to stabilize the quantum state through the quantum communications channel, and
      send information via the second pulse.

28. The quantum communications system of claim 27 wherein the first and second pulses have different energies.

29. The quantum communications system of claim 27 wherein the first and second pulses have different polarizations.

30. The quantum communications system of claim 27 wherein the receiver node comprises at least one single photon detector.

31. The quantum communications system of claim 27 wherein the first pulse comprises a modulated photon.

* * * * *